United States Patent [19]
Touzain et al.

[11] Patent Number: 4,584,252
[45] Date of Patent: Apr. 22, 1986

[54] INSERTION COMPOUNDS OF GRAPHITE WITH IMPROVED PERFORMANCES AND ELECTROCHEMICAL APPLICATIONS OF THOSE COMPOUNDS

[75] Inventors: Philippe Touzain, St. Ismier; Rachid Yazami, Domene; Jacques Maire, Paris, all of France

[73] Assignee: Le Carbone Lorraine, S.A., France

[21] Appl. No.: 612,437

[22] Filed: May 21, 1984

[30] Foreign Application Priority Data

May 19, 1983 [FR] France .................................. 84 08266
Apr. 13, 1984 [FR] France .................................. 84 06365

[51] Int. Cl.$^4$ .......................... H01M 4/02; C01B 31/00
[52] U.S. Cl. ...................................... 429/209; 429/218; 423/415 R
[58] Field of Search .............................. 429/209, 218; 423/415 R, 448; 502/180–182

[56] References Cited

U.S. PATENT DOCUMENTS

| | | | |
|---|---|---|---|
| 3,876,444 | 4/1975 | McKee | 423/448 X |
| 4,041,220 | 8/1977 | Armand | 429/194 X |
| 4,091,083 | 5/1978 | Hirschvogel et al. | 423/415 R |
| 4,145,483 | 3/1979 | Bonnemay et al. | 429/199 X |
| 4,329,216 | 5/1982 | DuBois | 204/296 X |

OTHER PUBLICATIONS

Chemical Abstracts: 100:71254, 100:54599, 94:216434, 99:165723.

Primary Examiner—Brian E. Hearn
Assistant Examiner—Stephen J. Kalafut
Attorney, Agent, or Firm—McDougall, Hersh & Scott

[57] ABSTRACT

The present invention relates to insertion compounds with improved performances for electrochemical applications. They are characterized in that they are obtained from a graphite with a specific surface area of at least 100 m2/g, and a granulometry at most equal to 4 μm. The graphite oxide or the graphite-NiCl$_2$ first stage obtained from such a graphite is used as constituting agent of the cathode of a lithium battery and it gives to same excellent characteristics. The graphite oxide performances may further be improved by preparing it by double oxidation of a graphite having any specific surface area and the granulometry is of the order of the μm, as shown by FIG. 2 which represents the intensiostatic discharge curves of the lithium batteries the cathode of which contains the graphite oxide.

7 Claims, 2 Drawing Figures

INSERTION COMPOUNDS OF GRAPHITE WITH IMPROVED PERFORMANCES AND ELECTROCHEMICAL APPLICATIONS OF THOSE COMPOUNDS

The present invention relates to insertion compounds with improved performances, and to their electrochemical applications, especially as constituting agents of electrodes for electrochemical generators, and especially for high energy density batteries using in their electrochemical chain alkaline metals such as lithium.

Research undertaken during the past few years on high energy density batteries using lithium at their anode often has been directed toward the development of new cathode materials. The conditions required for such materials (low equivalent mass, high potential relative to the anode, good conductivity both electronic and ionic, insolubility in electrolyte, . . . etc.) are difficult to meet together, and limitations of use rapidly appear.

The graphite insertion compounds have been much studied for the purpose of their electrochemical applications: CF graphite fluoride, graphite oxide, insertion compounds with metallic halides, etc.

Thus, in the high energy field, with batteries having a lithium anode, interesting results have been obtained with a cathode containing graphite fluoride.

Encouraging results also have been obtained with a cathode containing graphite oxide. However, their voltage, in the course of use goes down rather rapidly and their energy yield remains mediocre.

The main purpose of the present invention is to offset those drawbacks by improving the performances of the graphite insertion compounds which can be used in electrochemical applications.

That purpose is reached according to the present invention which consists of graphite insertion compounds characterized in that they are obtained from graphite powder having a large specific surface, of at least 100 m² per gram, and having a low granulometry, at most equal to 4 μm.

That "high surface" graphite for example may be obtained by grinding under vacuum natural graphite in a vibrating grinder (M. J. Kent Ph.D. Thesis, City University of London, 1973).

There is indeed observed that when making graphite insertion compounds by means of the methods suitable for each type of compound, but using such a graphite powder, their performance is definitely improved in the electrochemical field.

The choice of the insertion compound according to the present invention depends on the application considered.

Thus, as constituting agents of cathodes, in lithium batteries, those compounds can advantageously be graphite oxide or the graphite-NiCl₂ insertion compound.

When the constituting agent chosen is graphite oxide, the latter can be mixed with graphite or with a graphite insertion compound, with a chloride of a transition metal such as Fe, Ni, Cu, Mn.

Figure 1:
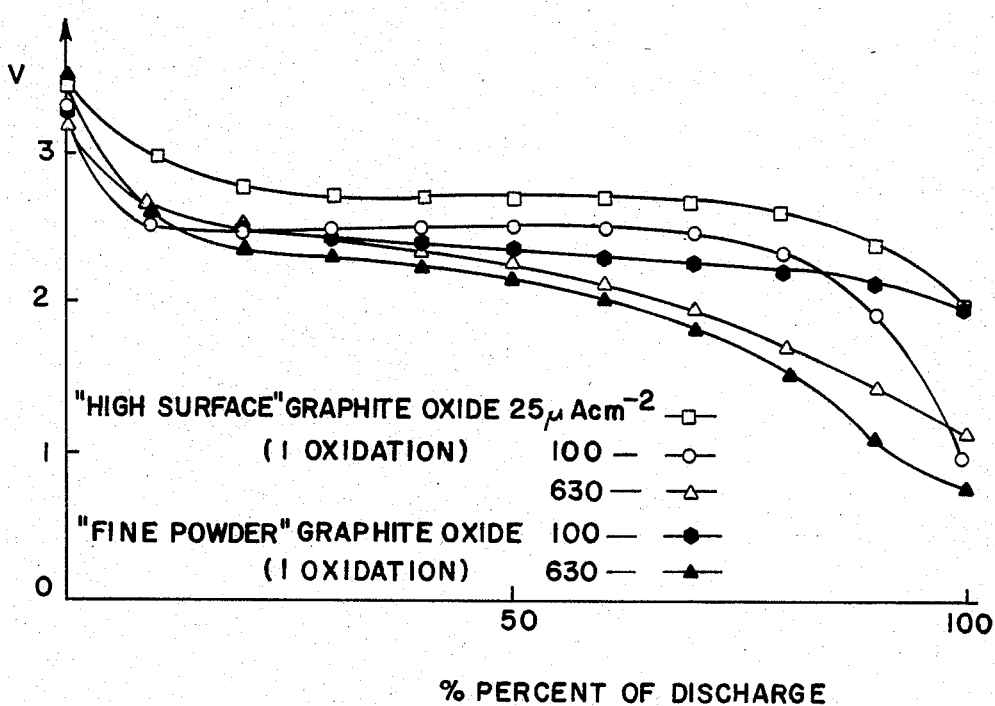
FIG. 1 shows discharge curves for cells using cathodes containing "High Surface" and "Fine Powder" graphite oxides.

The following examples are given only as indications, and they are not limitative, but they do illustrate the invention:

EXAMPLE I

Graphite oxide is prepared from graphite powder having a specific surface area ranging between 100 and 400 m² per gram, and a granulometry ranging between 2 and 4 μm.

The preparation method used is the Brodie method:

1 gram of graphite is treated with 10 ml of $HNO_3$ in concentrated form with 2 grams of $KClO_3$. At 60° C., under a dry nitrogen atmosphere, the mixture is kept under continuous agitation and in two hours it gives:

The graphite oxide which is obtained is washed several times with distilled water, then it is centrifuged until the $NO_3^-$, $Cl^-$, $ClO_3^-$, $H^+$, and $K^+$ have disappeared in the rinsing waters. Then it is dried under vacuum at room temperature for 24 hours.

There are then made from the graphite oxide which is obtained, electrodes by mixing it with a Ceylan graphite powder, then by compressing that mixture. The percentage of graphite by weight is variable. It can go from 50% approximately (in laboratory) to 10% (industrial).

Those electrodes thus made are mounted as cathodes in batteries in which the anode is of lithium and the electrolyte a 1M solution of $LiClO_4$ in propylene carbonate, so as to constitute several identical batteries.

Each battery thus made receives an intensiostatic discharge which is different, that is to say there is imposed a constant current intensity i which is different for each battery, and the voltage of the battery is measured as a function of the percentage of use of graphite oxide, that is to say of the Faradaic efficiency Ri. The maximum practical Faradaic yield or efficiency for a given battery corresponds to the energy yielded for the lowest voltage value e participating in the definition of the "e".

The value of the energy density D in Wh/Kg is given by the relation:

$$D = \frac{Q \text{"e"}}{m \times 3600}$$

with Q=total quantity of electricity available in the battery (in Coulombs)

"e" i=average value of the threshold voltage (in volts), for a given current density.

m=mass of the electro-active fraction of the cathode and of the anode, in kilograms.

The balance reaction of the battery, taking as formula graphite oxide $C_4OOH$ is:

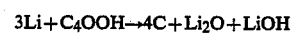

Consequently $Q = 96500 \times 3$ (in Coulombs)

$m = M_{C_4OOH} + 3M_{Li}$ (in kilograms)

The theoretical energy density Dth of the battery is the value of D for i=0.

The energy yield $R_E$ of the battery is:

$$R_E = \frac{\text{"e" } i}{\text{"e" } 0} \cdot Ri$$

The practical energy density Dpr is given by the relation:

Dpr = Dth × $R_E$

Table 1 summarizes the results:

TABLE 1

| i ($\mu A/cm^2$) | e i (V) | Dth (Wh/kg) | Ri % | $R_E$ % | Dpr (Wh/kg) |
|---|---|---|---|---|---|
| 0 | 3 | 2365 | | | — |
| 25 | 2.7 | — | 95 | 85 | 2020 |
| 100 | 2.5 | — | 90 | 75 | 1770 |
| 630 | 2.35 | — | 85 | 67 | 1558 |

When those results are compared with those obtained in the identical lithium batteries, except for the fact that the cathode is made up of graphite and of a graphite oxide coming from any graphite, there is observed that:
- the voltage curve f(Ri) presents a flat plateau for the High surface area Graphite, and not for the others.
- the value of the plateau is appreciably superior to the voltages corresponding to the same Ri in the other batteries with graphite oxide of natural graphite which has not been ground under vacuum.
- the energy yield of 75% to 85% is 1.2 to 3 times higher than with those other batteries.

There is thus seen therefore all of the advantage of graphite oxide obtained from graphite powder with a high specific surface area, and with a low granulometry according to the invention.

In addition, it is possible to establish comparisons with other batteries the characteristics of which are put together in the following Table 2.

TABLE 2

| Type of Batteries | Equivalent Mass | | Initial Electromotive Force V | Theoretical Energy Density Wh/kg |
|---|---|---|---|---|
| | Cathode Alone | Cathode And Anode | | |
| Li/C$_4$OOH According to the Invention | 27 | 34 | 3 | 2365 |
| Li/(CF) | 31 | 38 | 3 | 2116 |
| Zn Mn O$_2$ Battery | 87 | 120 | 1.5 | 335 |

The Li/C$_4$OOH battery according to the present invention is clearly seen as standing out from the point of view of its equivalent mass as well as from that of energy density.

In addition, when it is compared with the Li/CF battery, the performances of which are the closest, the Li/C$_4$OOH battery is the least expensive one: graphite oxide is less expensive than graphite fluoride.

EXAMPLE 2

That example is a variation of Example 1. The difference is that, at the time of the making of the electrode, the graphite mixed with graphite oxide is replaced with the insertion compound of graphite with MnCl$_2$: C$_7$MnCl$_2$ in equimass proportion.

The characteristics of the battery obtained are the following ones:

| i ($\mu A/cm^2$) | e i (V) | Dth (Wh/kg) | Ri % | $R_E$ % |
|---|---|---|---|---|
| 0 | 2.9 | 1550 | | |
| 100 | 2.4 | — | 90 | 75 |

The battery thus constituted presents the advantage that it can supply high current density values for short periods of time: of the order of 10 mA/cm$^2$ for a few minutes.

In those two examples, the preparation method of graphite oxide which is chosen is the Brodie method. It may be replaced with any other method and especially with that of Staudenmaier, which consists in slowly oxidizing the graphite by means of a mixture of potassium or sodium chlorate, concentrated sulfuric acid and fuming nitric acid, while maintaining the mixture at room temperature. That method will prevent the disappearance of the finest grains.

In addition, there is observed that:
- by proceeding to two successive oxidations of the "high surface area" graphite, its performances are further improved.
- by replacing the "high surface area" graphite with a graphite having any specific surface area but the granulometry of which is of the order of the $\mu$m (so-called 'fine powder' graphite), and proceeding to two successive oxidations of that 'fine powder' graphite, there are obtained results close to those obtained with the "high surface area" graphite.

The advantage of that double oxidation makes it possible to obtain a graphite oxide the O/C ratio of which is more important and, by that very fact, a graphite oxide which performs better.

In both cases, when a double oxidation is carried out, the planes of the graphite are well separated by the first one, and the addition of new oxidizing agents at the time of the second oxidation makes it possible to carry the oxidation of graphite to a higher level and therefore to increase the O/C oxidation ration of the latter.

Example 3 illustrates those variations.

EXAMPLE 3

There is prepared graphite oxide by the Brodie method described in Example 1, respectively from:
- "high surface area" graphite with a granulometry ranging between 2 and 4 $\mu$m,
- "fine powder" graphite the granulometry of which ranges between a few tenths and a few $\mu$m,
- for one part, causing them to undergo only one oxidation as in the main patent application and, for the other part, causing them to undergo two successive oxidations.

From the different graphite oxides obtained, there are then made electrodes in a manner identical with that described in Example 1, and the electrodes thus obtained are mounted as cathodes in batteries the anode of which is of lithium and the electrolyte is a 1M solution of LiClO$_4$ in propylene carbonate.

The different batteries thus constituted are then subjected to intensiostatic discharges.

Table 3 below shows the comparative results of the batteries, depending on the graphite oxide being used.

TABLE 3

| Original Graphite | i (μA/cm²) | ei (V) | Dth (Wh/kg) | Ri % | $R_E$ % | Dpr (Wh/kg) |
|---|---|---|---|---|---|---|
|  | 0 | 3 | 2365 | — | — | — |
| High surface area |  |  |  |  |  |  |
| 1 oxidation | 630 | 2.35 | — | 85 | 67 | 1580 |
| 2 oxidations | 630 | 2.25 | — | 100 | 75 | 1770 |
| Fine powder |  |  |  |  |  |  |
| 1 oxidation | 630 | 2.3 | — | 80 | 60 | 1420 |
| 2 oxidations | 630 | 2.3 | — | 100 | 77 | 1800 |

Figure 2:
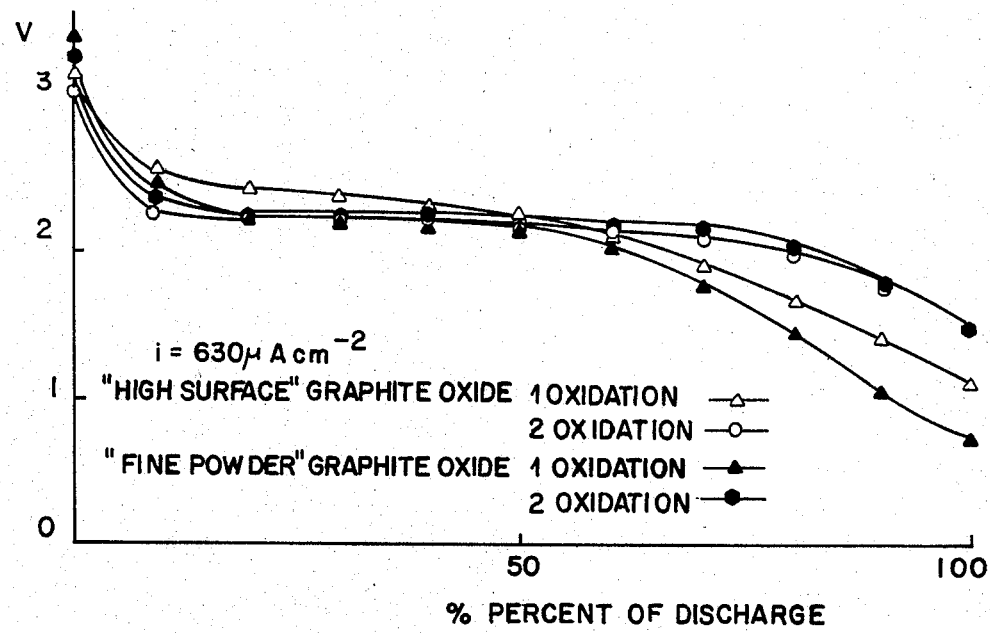
FIG. 2 shows discharge curves for cells using each of these oxides which have been subjected to either one or two oxidations.

FIGS. 1 and 2 show the discharge curves.

For one part, with electrodes comprising graphite oxide obtained from "high surface area" graphite (O.G. High Surface), or from "fine powder" graphite (O.G. fine Powder), which has been subjected to one oxidation only, for different current densities (FIG. 1).

For the other part, with electrodes comprising graphite oxide obtained either from "high surface" graphite, or from "fine powder" graphite, which has undergone one or two oxidations, for a same value of current density (FIG. 2).

The table and figures show that:
graphite oxide coming from a "high surface" graphite leads to better electrochemical characteristics than does graphite oxide coming from a "fine powder" graphite in the case of the single oxidation,
the graphite oxide obtained from a "fine powder" grapite subjected to a double oxidation leads to results close to those obtained with a grapite oxide obtained from a "high surface" graphite.

EXAMPLE 4: Graphite/$NiCl_2$ insertion compound

There are prepared graphite/$NiCl_2$ insertion compounds from different graphite powders:
graphite which has a specific surface of 300 m²/g and a granulometry of <3 μm, according to the present invention,
natural graphite with a granulometry ranging between 80 and 125 μm,
natural graphite (from Madagascar) in fine flakes the size of which is of the order of the mm,
pyrographite with a granulometry of ≃ 5 mm.

The preparation method, identical in the four cases, consists of preparing a mixture of graphite with $NiCl_2$, in dehydrating that mixture at 300° C. for ten hours under vacuum, in introducing chlorine in a quantity sufficient to ensure a pressure of 2 atmospheres at 25° C., in sealing the enclosure containing those products and finally in heating to 700° C.

The products obtained are washed with acetonitrile in order to eliminate the excess of $NiCl_2$, then they are dried in an oven.

By analysis under X-rays, there is seen that the graphite according to the present invention leads to an insertion compound of the first stage which is practically pure, while when the size of the grains of graphite increases, less and less first stage compound is formed in favor of the second stage compound, respectively $C_6NiCl_2$ and $C_{12}NiCl_2$.

Table 4 contains the results as a function of the initial graphite.

TABLE 4

| Initial Graphite | Granulometry | Abundance of the compound obtained | | |
|---|---|---|---|---|
|  |  | 1st stage | 2nd stage | Graphite |
| High surface graphite | 3 μm | very rich | traces | nothing |
| Natural graphite | 80–125 | traces | present | nothing |
| Natural graphite | 1 mm | traces | abundant | traces |
| Pyrographite | ≃5 mm | traces | abundant | traces |

There are made, from the graphite/$NiCl_2$ insertion compound of the first stage obtained according to the invention, electrodes simply by stamping the compound.

Those electrodes are mounted as cathodes in lithium batteries the anode of which is of lithium and the electrolyte is a 1M solution of $LiClO_4$ in propylene carbonate, in a manner such as to constitute several identical batteries.

Their characteristics are measured by intensiostatic discharge as in Example 1.

Table 5 contains the results obtained.

TABLE 5

| i (μA/cm²) | ei (V) | Dth (Wh/kg) | Ri % | $R_E$ % | Dpr (Wh/kg) |
|---|---|---|---|---|---|
| 0 | 2.8 | 700 | — | — | — |
| 100 | 2.5 | — | 95 | 85 | 600 |

Since the "high surface graphite" makes it possible to obtain the first stage of the graphite/$NiCl_2$ insertion compound, there is consequently obtained an active electrode material with an energy capacity 30% higher than that of the other electrodes of the same nature known to this day.

Cyclic voltaimetry indicates a reversibility of positive electrodes which have been discharged only partially. (50%).

I claim:

1. An electrochemical generator electrode comprising a graphite oxide mixed with a graphite insertion compound with a chloride of a transition metal, said graphite oxide being obtained from a graphite having a specific surface area of at least 100 m²/g, and a granulometry at most equal to 4 microns.

2. An electrochemical generator electrode according to claim 1, characterized in that the graphite oxide is obtained by means of two successive oxidations of the graphite which has a specific surface area of at least 100 square meters per gram.

3. An electrochemical generator electrode according to claim 1, characterized in that the graphite insertion compound with a chloride of a transition metal is the $C_7MnCl_2$ compound.

4. An electrochemical generator electrode comprising a graphite insertion compound of a graphite—$NiCl_2$ compound of the first stage: $C_6NiCl_2$, said graphite insertion compound being obtained from a graphite having a specific surface area of at least 100 m²/g, and a granulometry at most equal to 4 microns.

5. An electrochemical generator comprising at least one electrode as claimed in claim 4 and characterized in that its electrochemical chain is of the type:

Li/1M $LiClO_4$ solution in propylene carbonate/graphite-$NiCl_2$ insertion compound, $C_6NiCl_2$,
its threshold voltage during an intentiostatic discharge with a current density of 100 μA/cm² is 2.5 V, its theoretical energy density is 700 Wh/kg,
its Faradaic efficiency is 95%, its energy efficiency is 85%.

6. An electrochemical generator characterized in that it comprises at least one electrode such as claimed in claim 1 or 4.

7. An electrochemical generator comprising at least one electrode containing a graphite insertion compound obtained from a graphite having a specific surface area of at least 100 m$^2$/g and a granulometry at most equal to 4 microns, characterized in that its electrochemical chain is of the type:

Li/solution 1M of LiClO$_4$, in propylene carbonate/graphite oxide mixed with graphite, its threshold voltage during an intensiostatic discharge with a current density of 100 μA/cm$^2$, is 2.5
its theoretical energy density is 2365 Wh/kg, V,
its Faradaic efficiency is 90%,
its energy yield is 75%.

* * * * *

UNITED STATES PATENT OFFICE
CERTIFICATE OF CORRECTION

Patent No. 4,584,252　　　　　　　　Dated April 22, 1986

Inventor(s) TOUZAIN ET AL.

It is certified that error appears in the above-identified patent and that said Letters Patent are hereby corrected as shown below:

Title Page:　　[30] Foreign Application Priority Data, May 19, 1983 [FR] France "84 08266" should be -- 83 08266 --

Signed and Sealed this

Tenth Day of March, 1987

Attest:

DONALD J. QUIGG

Attesting Officer　　　　Commissioner of Patents and Trademarks